Sept. 5, 1961 P. B. MORGAN 2,998,776
RELIABLE BATTERY POWER SUPPLY
Filed June 20, 1958

*INVENTOR.*
PAUL B. MORGAN
BY
ATTYS.

United States Patent Office 2,998,776
Patented Sept. 5, 1961

2,998,776
RELIABLE BATTERY POWER SUPPLY
Paul B. Morgan, 8302 Rosette Lane, Adelphi, Md.
Filed June 20, 1958, Ser. No. 743,512
1 Claim. (Cl. 102—70.2)
(Granted under Title 35, U.S. Code (1952), sec. 266)

The invention described herein may be manufactured and used by or for the Government of the United States of America for governmental purposes without the payment of any royalties thereon or therefor.

This invention relates generally to a battery power supply and more particularly to a battery power supply including a plurality of batteries connected in parallel and having in series with each battery a protective device to prevent draining of the battery in the event that one of them fails in dead short or the polarity of one battery is inadvertently reversed.

It is an object of this invention to provide a highly reliable power supply which is simple and inexpensive.

A further object is the provision of a new and improved power supply for initiating a detonator which power supply is connected to the detonator by closing a normally opened firing switch.

Figure 1A:
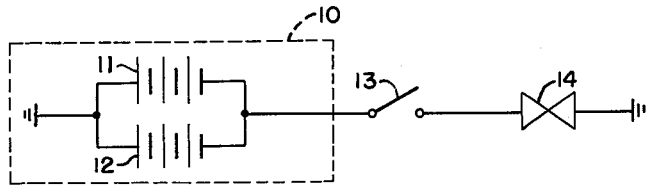
Figure 1B:
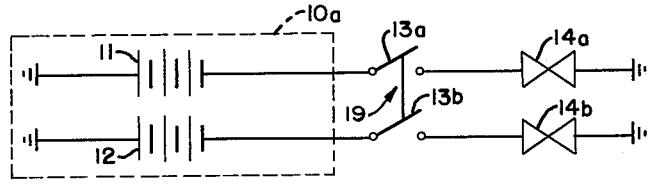
Figure 1C:
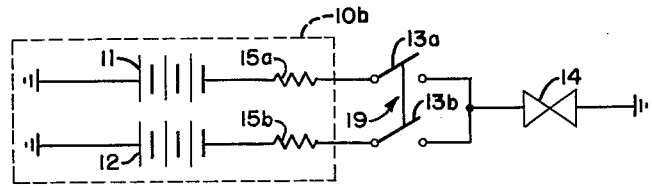
Figure 2A:
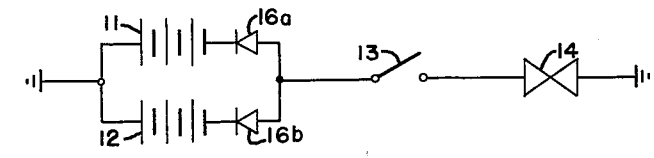
Figure 2B:
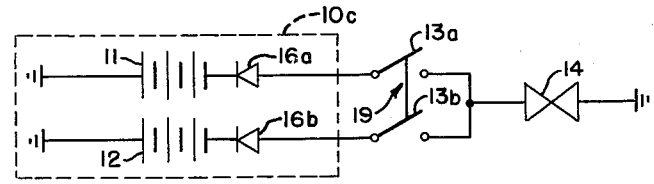
Figure 2C:
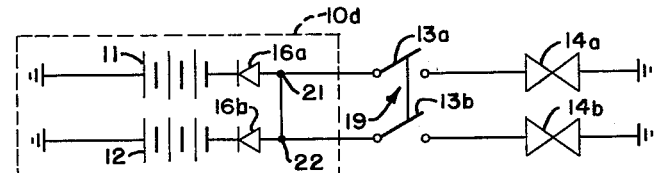

This invention may be more readily understood by referring to the accompanying drawing wherein like parts designate like or similar parts throughout the various views and in which:

FIGS. 1a–1c show the type of power supplies for initiating a detonator found in a prior art; and FIGS. 2a–2c are circuit diagrams of power supplies embodying the principles of this invention.

As shown in FIG. 1a, one mode of constructing a power supply 10, utilized prior to this invention, is to connect two batteries 11 and 12 in parallel. A switch 13, normally open, connects one of the common terminals to a detonator 14 so that when switch 13 is closed the batteries 11 and 12 discharge through detonator 14 thereby igniting it. It should be obvious that if either battery 11 or battery 12 fail as a dead short, the remaining good battery would discharge across it thereby draining the power supply 10, so that when switch 13 is closed, insufficient potential will be applied across the detonator 14 to ignite it.

In order to overcome this difficulty it has been the practice, whenever a high degree of realibility must be maintained, to parallel the whole system. That is, utilize two detonators 14a and 14b in power supply 10a and connect them to different poles of a double-pole, single-throw switch 19 so that in effect there are two parallel systems which are operated simultaneously. Therefore, if the system 11, 13a, 14a fails, system 12, 13b, 14b will fire. The deficiency of this system is that the detonator must be duplicated and a more complex switch must be used. This increases the bulk of the detonator and its circuitry and therefore increases the cost of the entire device.

FIG. 1c shows another arrangement wherein batteries 11 and 12 of power supply 10b are serially connected to resistors 15a and 15b and to the poles 13a and 13b of the double-pole, single-throw switch 19. The terminals of the switch are then connected to one side of the detonator 14 having its other side grounded as are detonators 14, 14a, 14b in FIGS. 1a and 1b. The resistors 15 impede a good battery draining across a defective battery in the event that one fails as a dead short, however, when the switch is closed a portion of the power is dissipated in resistors 15. Accordingly, the batteries 11 and 12 must be of a greater potential than would normally be required, thereby increasing the cost and bulk of the system.

Referring now to FIG. 2a, it is seen that in the present invention, the circuit may be generally similar to that of FIG. 1a except that a pair of diodes 16a and 16b are connected in series with batteries 11 and 12 respectively. When switch 13 is closed, the diode 16a permits the battery 11 to discharge across detonator 14. Similary, diode 16b permits the battery 12 to discharge across the detonator. However, in the event that battery 11 should fail as a dead short or is improperly inserted so that its polarity is reversed, battery 12 cannot drain across it because the diode 16a prevents flow of electrons from right to left across diode 16a as seen in FIG. 2a. Similarly, diode 16b presents battery 11 from draining across battery 12 in the event that the latter should fail as a dead short.

FIG. 2b is generally similar to FIG. 1c except that the resistors 15 are replaced by diodes 16a and 16b. By substituting these diodes for the resistors it is possible to employ smaller batteries 11 and 12 to initiate the detonator 14.

In FIG. 2c is shown still another embodiment of this invention, wherein the two batteries in parallel 11 and 12 may be utilized to detonate two detonators 14a and 14b. In this embodiment detonators 14a and 14b may be widely separated, and it may be desirable to ignite both simultaneously. Diodes 16a and 16b are connected in series with batteries 11 and 12 respectively so that when the double-pole single-throw switch 19 is closed the detonators 14a and 14b are connected across batteries 11 and 12. By connecting the terminal 21 of diode 16a to the terminal 22 of diode 16b, the detonators 14a and 14b may be detonated by either of the batteries 11 or 12 without draining one or the other of the batteries across the remaining battery in the event that it fails as a dead short. In other words, should battery 11 fail as a dead short, battery 12 may ignite both the detonators 14a and 14b thereby increasing the reliability of the system as a whole without increasing the size of the batteries as was the case in the device shown in FIG. 1c.

If, upon testing and using the specific circuits embodying the principles of this invention, it becomes evident that the diode elements 16a and 16b tend to fail as open circuits, each of the diode elements shown may be replaced by two or more diodes in parallel. On the other hand, if they fail as short circuits, they may be replaced by two or more diodes cascaded in series. Provided the ratio of these two types of failures is known, the ratio may be balanced out by two or more parallel connected groups of diode elements cascaded in series, each group consisting of two or more diode elements in parallel. This arrangement would yield an ultra reliable device.

Although this invention has been described in detail with reference to a few embodiments which give satisfactory results, it is by no means so limited but is susceptible of many modifications without departing from the scope thereof. Therefore, the foregoing specification should not be construed as limiting this invention in any manner, and this invention is to be defined by the scope of the appended claim.

What is claimed as new and desired to be secured by Letters Patent of the United States is:

A battery power supply comprising; a plurality of batteries connected in parallel, a plurality of electrically initiated detonators each serially connected to a respective one of the batteries, normally open double pole, single throw switch means for discharging said batteries across the respective detonators, a plurality of unidirectional conducting devices, each connected in series with a respective battery between the battery and said switch means to permit electron flow only in a direction away from the negative terminal of its respective battery when said switch is closed and to prevent electron flow into the negative terminal of said battery when said switch is open, means for mutually interconnecting the inputs of said detonators upon closure of said switch thereby insuring initiation of every detonator.

References Cited in the file of this patent

UNITED STATES PATENTS

| | | |
|---|---|---|
| 2,110,049 | Miller | Mar. 1, 1938 |
| 2,569,511 | Bickel | Oct. 2, 1951 |

FOREIGN PATENTS

| | | |
|---|---|---|
| 369,142 | Italy | Mar. 13, 1939 |